Patented Sept. 4, 1951

2,566,537

UNITED STATES PATENT OFFICE 2,566,537

PEROXIDE CATALYZED POLYMERIZATION OF ETHYLENE IN THE PRESENCE OF A PHENOLIC COMPOUND

Louis Schmerling, Riverside, Ill., assignor to Universal Oil Products Company, Chicago, Ill., a corporation of Delaware No Drawing. Application March 30, 1948,
Serial No. 18,073

13 Claims. (Cl. 260—94.9)

This invention relates to the production of ethylene polymers. It is more specifically concerned with the catalytic polymerization of ethylene in the presence of an organic peroxide, a diluent, and a phenolic compound.

The peroxide catalyzed polymerization of ethylene is assuming growing importance due to the increasing utilization of the products thereby produced. Many of the polymerization processes of this type use a diluent such as an alcohol, an aromatic hydrocarbon, or a saturated hydrocarbon containing at least 3 carbon atoms per molecule. When saturated hydrocarbon diluents are employed at low to moderate pressures, i. e., not exceeding several hundred atmospheres, the polymer produced is quite soft, and has a relatively low melting point and possesses a grease-like consistency. When other diluents are used under similar conditions, the polymer produced is of wax-like consistency. I have now found that when phenolic compounds are used in conjunction with such diluents the melting point of the polymer is increased considerably and the consistency of the product changes from that of a grease-like petrolatum to that of a wax or from a wax to a harder wax. In addition, the presence of the phenolic compound frequently increases the yield.

In one embodiment my invention relates to a polymerization process which comprises subjecting ethylene to the action of an organic peroxide polymerization catalyst at polymerizing conditions in the presence of a diluent and a phenolic compound.

In a more specific embodiment my invention relates to a polymerization process which comprises subjecting ethylene to the action of an organic peroxide polymerization catalyst at a superatmospheric pressure and a temperature at least as high as the decomposition temperature of said catalyst and in the presence of a diluent and a phenolic compound.

The ethylene charged to my process may be obtained from any source, such as the oxidative cracking of ethane, dehydrogenation of ethane, the dehydration of ethyl alcohol, and particularly the thermal and catalytic cracking and reforming of higher boiling hydrocarbons. Many of the known processes for polymerizing ethylene require a highly purified charge stock, i. e., the ethylene has to be substantially free from other hydrocarbons and from dissolved oxygen. In contrast, the yield and quality of the polymerization product in my process are substantially unaffected by the presence of other hydrocarbons, such as ethane, or by the presence of dissolved oxygen. Thus an ethane-ethylene fraction may be charged to the process of this invention together with a suitable organic peroxide polymerization catalyst and a diluent. The olefin is converted to a polymer thereof in good yields and the ethane in the product is simply and inexpensively separated from the polymers. There is no need for a costly charge stock purification step.

The diluents that may be used in the present process include alcohols, such as tertiary butyl alcohol, aromatic hydrocarbons such as benzene, toluene, ethylbenzene and xylenes; and saturated hydrocarbons containing 3 or more carbon atoms per molecule, such as normal butane, isobutane, cyclohexane, and methylcyclohexane.

Catalysts which may be used in the present process comprise those organic peroxides which catalyze the polymerization of ethylene. These substances include peracetic acid, diacetyl peroxide, toluic acid peroxide, oleic peroxide, benzoyl peroxide, tertiarybutyl perbenzoate, ditertiarybutyl peroxide, hexyl peroxide, tertiarybutyl hydroperoxide, and methylcyclohexyl hydroperoxide.

The phenolic compounds that may be used in the present process include phenol; alkylphenols, such as 2,4-dimethyl-6-tertiarybutylphenol and 2,6-ditertiarybutyl-4-methylphenol; α-naphthol; dihydroxynaphthalenes, such as 1,5- and 1,7-dihydroxynaphthalenes and the monoalgylethers; thereof 1 - hydroxy-4-alkoxy-5,8-dihydronaphthalenes, such as 1-hydroxy-4-methoxy-7-methoxy-7 methyl-5,8-dihydronaphthalene; catechol and alkyl catechols including nordihydroguiairetic acid; dihydroxybenzenes, such as hydroquinone, and alkyl-dihydroxybenzenes and monoalkylethers thereof, such as 2-tertiarybutyl-4-methoxyphenol; trihydroxybenzenes such as pyrogallol and alkylpyrogallols; alkyl gallates; 2,2-dimethyl - 5 - hydrox-6-tertiarybutylcoumaran; and 2,2 - dimethyl-6-hydrox-7-tertiarybutylchroman. It can be seen that the phenolic compounds may be mono or polynuclear and may contain one or more hydroxyl groups (i. e., be mono- or polyhydric phenols) and substituted hydroxyl groups such as alkoxy substituents.

The process of my invention may be carried out in batch operation by placing a quantity of the diluent, the phenolic compound, and a catalyst in a reactor equipped with a mixing device, adding the ethylene, heating to a reaction temperature while mixing the contents of the reactor, cooling after a suitable period of time and recovering the polymer. The preferred method of operation is of the continuous type. In this method of operation the ethylene, diluent, phenolic compound, and catalyst are continuously charged to a reactor maintained under suitable conditions of temperature and pressure. The reactor may be an unpacked vessel or coil or it may contain an adsorbent packing material, such as fire brick, alumina, dehydrated bauxite, and the like. The polymer is separated from the reactor effluent, usually by fractionation. The diluent and unconverted ethylene may be recycled to the reaction zone.

Another mode of operation that may be used comprises the fluidized type wherein the charge is passed upwardly through a bed of finely divided adsorbent material, thereby causing the particles to become motionalized and forming a fluid-like mass. A portion of the adsorbent material may be continuously withdrawn from the reaction zone, cooled, and returned thereto, thus providing an efficient method of removing the heat of reaction.

Instead of separately adding the peroxide catalyst to the reaction zone, I have found that it frequently is desirable and economical to form the catalyst in situ in the diluent, when said diluent is a hydrocarbon, and then to charge the resulting solution to the reaction zone together with the ethylene and the phenolic compound. Formation of the peroxide in the hydrocarbon diluent may be accomplished by autooxidation, i. e., by heating the hydrocarbon while air is bubbled through it, preferably in the presence of a trace of peroxide formed in a previous autooxidation. Alternatively, the air may be passed through the hydrocarbon in the presence of an oxidation catalyst such as manganese stearate. In some cases it will be beneficial to add a minor amount of an olefinic or a cycloolefin in hydrocarbon to the diluent before passing air through it.

In the continuous methods of carrying out my process, the catalyst is added continuously to the reaction zone, but, if desired, it may be added intermittently, particularly when a packing material which tends to retain catalyst is employed in the reactor.

The temperature employed in the process of this invention should be at least as high as the initial decomposition temperature of the peroxide used as the catalyst. In the case of tertiarybutyl perbenzoate, for example, the decomposition temperature is approximately 115° C. Higher temperatures may be employed, but ordinarily little advantage is gained if the temperature is more than about 150° C. higher than the decomposition temperature of the catalyst.

In contrast to many of the prior art processes, pressures as low as 15 atmospheres and lower may be employed with good results in my process. On the other hand, pressures as high as 500 atmospheres or greater may be used. In general, the molecular weight of the polymer increases with increasing pressure.

The concentration of catalyst utilizable in my process can vary over a wide range. For reasons of economy, it generally is advisable to use low concentrations of catalyst such as from about 0.1% to 4% of the ethylene charged. Higher concentrations of catalyst usually result in lower molecular weight products.

In batch operation and in flow operations that do not employ packing materials, the contact time ordinarily will be in the range of from about 3 minutes to about 6 hours. Contact times of at least 10 minutes usually are preferred. In fixed bed operation the space velocity, defined as the volume of liquid charged per hour divided by the superficial volume of the packing, ordinarily will be within the range of from about 0.1 to about 10.

The ratio of diluent to ethylene charged to the reaction zone may vary over a relatively broad range, i. e., the ratio is not particularly critical so long as there is sufficient diluent to effect dissolution of the ethylene and the product derived therefrom. A 1:1 ratio ordinarily is satisfactory, but economic and operating costs may dictate the use of higher or lower ratios.

The amount of phenolic compound utilized in my process generally will be less than the amount of peroxide employed. Good results have been obtained when one part of phenolic compound was present per ten parts of catalyst. Much less may often be used.

The following examples are given to illustrate my invention, but they are not introduced with the intention of unduly limiting the generally broad scope of said invention. The experiments given under the examples were carried out by heating the reactants at the temperature specified in glass liners in a rotating autoclave for 4 hours. The charge in each case consisted of 50 grams of diluent, 3 grams of tertiarybutyl perbenzoate (unless otherwise noted), 0.3 gram of a phenolic compound, and ethylene to a pressure of 40–60 atmospheres.

EXAMPLE I

*Effect of hydroquinone using methylcyclohexane as the diluent*

| | | |
|---|---|---|
| Phenolic compound | None | Hydroquinone. |
| Reaction temperature | 115 | 115. |
| Polymer: | | |
| Weight, grams | 24 | 21. |
| Consistency | Grease-like | Waxy. |
| Melting point, °C | 81 | 1100. |

It can be seen that the presence of hydroquinone greatly increased the melting point of the polymer and changed its consistency from that of a grease to that of a wax.

EXAMPLE II

*Effect of hydroquinone using tertiary butyl acohol as the diluent*

| | | |
|---|---|---|
| Phenolic compound | None | Hydroquinone. |
| Reaction temerature | 115 | 115. |
| Polymer: | | |
| Weight, grams | 16 | 22. |
| Consistency | Grease-like | Waxy. |
| Melting point, °C | 78 | 98. |

The data shows that when using tertiary butyl alcohol as a diluent, the presence of hydroquinone not only increased the melting point and changed the consistency of the product, but it resulted in a substantially greater yield of polymer.

EXAMPLE III

*Effect of hydroquinone using benzene as the diluent*

| | | |
|---|---|---|
| Phenolic compound | None | Hydroquinone. |
| Reaction temperature | 115 | 115. |
| Polymer: | | |
| Weight, grams | 15 | 16. |
| Consistency | Waxy | Waxy. |
| Melting point, °C | 95 | 105. |

The data show that when benzene is used as the diluent, the hydroquinone has a small effect on the yield of polymer, but the melting point of said polymer is substantially increased.

EXAMPLE IV

*Effect of 2-tert-butyl-4-ethoxyphenol using methylcyclohexane as the diluent*

In the experiments given below 3 grams of ditertiarybutyl peroxide was used as the catalyst instead of tertiarybutyl perbenzoate:

| | | |
|---|---|---|
| Phenolic compound | None | 2-t-Butyl-4-ethoxyphenol |
| Reaction temperature | 130 | 130 |
| Polymer: | | |
| Weight, grams | 46 | 28 |
| Consistency | Grease-like | Waxy |
| Melting point, °C | 72 | 90 |

It can be seen that the alkylalkoxyphenol used in the second experiment had an effect on the melting point similar to that of hydroquinone.

I claim as my invention:

1. In the polymerization of ethylene in the presence of an organic peroxide catalyst and a diluent selected from the group consisting of alcohols, aromatic hydrocarbons and saturated hydrocarbons containing at least 3 carbon atoms per molecule, the improvement which comprises adding to the reaction mixture a phenolic compound consisting of carbon, hydrogen and oxygen in sufficient amount to increase the melting point of the ethylene polymer and subjecting the mixture to polymerization under a pressure of from about 15 to about 500 atmospheres and at a temperature at least as high as the decomposition temperature of said catalyst.

2. The improvement of claim 1 further characterized in that said phenolic compound is a monohydric phenol.

3. The improvement of claim 1 further characterized in that said phenolic compound is an alkylphenol.

4. The improvement of claim 1 further characterized in that said phenolic compound is a 2,4-dialkyl-6-tertiaryalkylphenol.

5. The improvement of claim 1 further characterized in that said phenolic compound is a 2,4-dimethyl-6-tertiaryalkylphenol.

6. The improvement of claim 1 further characterized in that said phenolic compound is a 2,4-dimethyl-6-tertiarybutylphenol.

7. The improvement of claim 1 further characterized in that said phenolic compound is a polyhydric phenol.

8. The improvement of claim 1 further characterized in that said phenolic compound is an alkyl substituted polyhydric phenol.

9. The improvement of claim 1 further characterized in that said phenolic compound is an alkyl alkoxyphenol.

10. The improvement of claim 1 further characterized in that said phenolic compound is a 2-tertiaryalkyl-4-alkoxyphenol.

11. The improvement of claim 1 further characterized in that said phenolic compound is a 2-tertiarybutyl-4-alkoxyphenol.

12. The improvement of claim 1 further characterized in that said phenolic compound is a 2-tertiarybutyl-4-ethoxyphenol.

13. The improvement of claim 1 further characterized in that said phenolic compound is hydroquinone.

LOUIS SCHMERLING.

REFERENCES CITED

The following references are of record in the file of this patent:

UNITED STATES PATENTS

| Number | Name | Date |
|---|---|---|
| 2,395,381 | Squires | Feb. 19, 1948 |